Jan. 5, 1965  G. McQ. KILMER  3,164,397
COME APART BICYCLE
Filed Sept. 11, 1963

INVENTOR.
George McQ. Kilmer
BY
Joseph J. Julian
his Attorney 3,164,397
COME APART BICYCLE
George McQ. Kilmer, % Veterans' Administration
Hospital, Fort Howard, Md.
Filed Sept. 11, 1963, Ser. No. 308,166
3 Claims. (Cl. 280—287)

This invention relates to bicycles and more particularly to a bicycle frame composed of separable sections, permitting the frame to be divided into two parts, one of which carries the front fork and its wheel and the other carrying the rear wheel.

It is an object of the invention to provide a bicycle frame of this character which will enable the two sections or halves of the frame to be completely separated from one another when desired, thereby decreasing the overall length of the bicycle and permitting its convenient transportation, shipment or storage.

It is an object of the invention to provide a so-called "come-apart" type of bicycle frame by means of which the owner of the same can, when the parts of the frame are separated, readily transport the bicycle within an automobile, or can so package its separated sections that the same can be readily mailed or shipped while being contained in relatively small cartons.

It is another object of the invention to provide a come-apart bicycle frame in which the divisible sections are coupled together by the utilization of standard, readily-obtainable parts.

More particularly, the invention contemplates the provision of a bicycle frame having divided upper and lower bars or tubes containing interiorly-fitted reinforcing dowels or sleeves which bridge the points of separation of the parts of the tubes or bars, and with readily-removable fastening elements such as bolts, extended through the tubes and reinforcing sleeves to thereby hold the parts of the frame in strongly connected relation.

With these and other objects to be hereinafter set forth in view, I have devised the arrangement of parts to be described and more particularly pointed out in the claims appended hereto.

In the accompanying drawing, wherein an illustrative embodiment of the invention is disclosed, FIG. 1 is an elevational view of a come-apart bicycle frame embodying the present invention;

Figure 1:
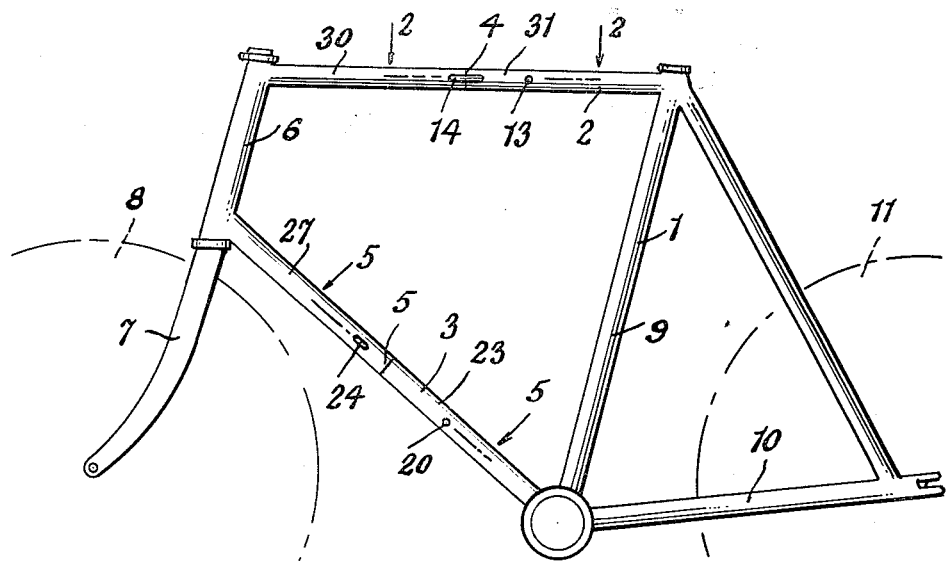

Referring to the drawing, 1 indicates generally, a bicycle frame of known type and which includes an upper tubular bar or frame member 2 and a lower, angularly-disposed tubular frame bar 3. The upper bar 1 is transversely severed at a substantially central point as indicated at 4, and the lower bar 3 is similarly transversely severed on the line 5. The severance of the two frame elements 2 and 3 results in the frame being formed into two separable sections, namely, a front section 6 carrying the front fork 7 and its wheel 8, and a rear section 9 provided with the rear fork 10 carrying the rear wheel 11.

Figure 3:
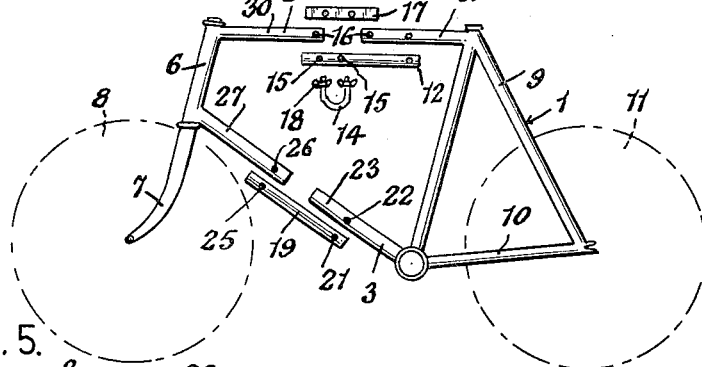
FIG. 3 is an exploded view of the bicycle frame and the parts by which the two sections of the frame are detachably coupled together.

When these two sections 6 and 9 are completely separated from one another, as shown in FIG. 3, the sections may be placed together in such a manner that the overall size of the bicycle will then be very materially reduced so that it can be then readily fitted into the trunk portion of an automobile or in the back passenger-carrying part of the car. Also, if the wheels 8 and 11 are removed and are packaged separately from the frame sections, the parts of the bicycle can be readily contained in relatively small cartons or packages and mailing, shipping or transporting of the bicycle will thus be greatly facilitated.

Figure 2:
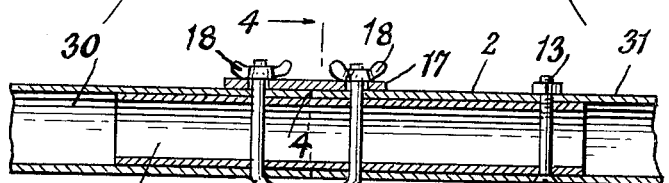
FIG. 2 is a sectional view, taken substantially on the line 2—2 of FIG. 1, looking in the direction of the arrows.
Figure 4:
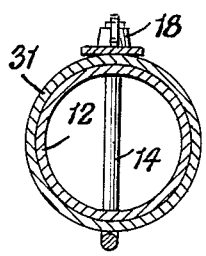
FIG. 4 is a sectional view, taken substantially on the line 4—4 of FIG. 2, looking in the direction of the arrows.

The means for coupling together the parts 30 and 31 of the top bar 2 of the frame, are shown in FIGS. 2, 3 and 4 wherein it will be noted that the point of division 4 of this upper bar is bridged by a reinforcing dowel, tube or sleeve 12 (FIG. 2) inserted within the bar 2 and secured to the part 31 thereof by means of a bolt 13 extending transversely through the part 31 of the bar 2 and through a hole provided in the tube 12. The dowel or tube 12 is thus fitted within the bar 2, and has a portion projecting forwardly out of the part 31 of the bar 2, and may remain attached to the part 31 of the frame even while the rear section 9 of the frame is detached from the front section 6.

When the two frame sections 6 and 9 are coupled together, the reinforcing dowel or tube 12 will bridge the point of separation 4 and reinforce the joint. A U-bolt 14 has its legs extended through holes 15 provided in the dowel or tube 12 and through registered holes 16 provided in the parts 30 and 31 of the bar 2. The U-bolt 14 also passes through holes in a reinforcing plate 17 and wing nuts 18 are threadably received on the legs of the U-bolts to hold the parts together substantially as shown in FIGS. 2 and 4.

Figure 5:
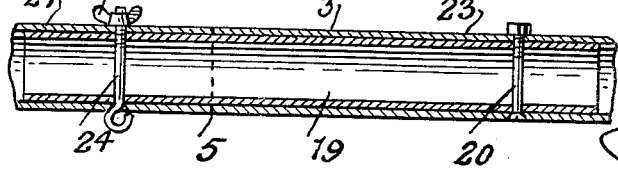
FIG. 5 is a sectional view, taken substantially on the line 5—5 of FIG. 1, looking in the direction of the arrows.

The means for uniting the parts of the lower tubular bar 3, are shown in FIGS. 3 and 5. It will be noted therein that the line of division 5 between the parts 23 and 27 of the bar 3, is bridged by an inserted dowel, tube or sleeve 19 which fits within the bar 3 and may be permanently attached to the part 23 by means of a bolt 20 or an equivalent fastening member which is extended through a hole 21 in the dowel or tube 19 and through the registered hole 22 in the part 23 of the bar 3. A bolt 24 is extended through the hole 25 in the tube 19 and through the registered hole 26 in the part 27 of the bar 3 as shown in FIG. 5. A wing nut 28 is provided on the bolt 24, permitting easy removal of said bolt when it is desired to separate the two sections 6 and 9 of the frame.

When the two sections 6 and 9 are in their connected relationship, the parts appear as seen in FIG. 1. When it is desired to separate the sections of the frame, the wing nuts 18 are removed and the U-bolt 14 withdrawn. Similarly, wing nut 28 is removed and the bolt 24 is withdrawn. The two frame sections 6 and 9 may then be pulled apart, the reinforcing tube or dowel 12 remaining attached to the part 31 of the tube 2 by means of the bolt 13. The tube or dowel 19 may remain attached to the part 23 of the bar 3 by means of the bolt 20. The reinforcing dowels or tubes 12 and 19 may, of course, be completely removed by the removal of all of the bolts.

When the two frame sections are separated as above described, it will be apparent that they will provide for easier transport, shipment or storage than is possible in the case of the conventional bicycle. I am aware that prior to the present invention, efforts have been made to produce so-called "folding bicycles" and which embodied a hinged connection between parts of the frame. However, the present invention provides for the complete separation of the parts of the frame so that the parts thereof when physically separated as herein described may be separately packaged, carried or stored, thus providing for a facility not present in bicycles of the folding type.

The parts employed for uniting the frame sections of the bicycle, namely, the dowels or reinforcing sleeves 12 and 19; the plate 17, and the bolts 13, 14, 20 and 24, are standard, easily-obtained parts and with the drilling of a few small holes the parts may be quickly fitted in place.

The separation of the frame parts is speedily done by the removal of three wing nuts and the withdrawal of the bolts from which the nuts were removed and the two frame parts easily pulled apart and carried, packaged or stored.

Having thus described a single embodiment of the invention, it is obvious that the same is not to be restricted thereto, but is broad enough to cover all structures coming within the scope of the annexed claims.

What I claim is:

1. A bicycle having a frame provided with a top tube and an angular bottom tube, said tubes being each transversely severed to thereby divide the frame into a separate front part and a rear part, an insert fitted in each tube and bridging the joint between the front and rear parts thereof, at least one of the inserts being engaged by clamping means having legs passed completely through parts of the insert and through parts of the tube on opposite sides of the division of the tube in which said one insert is disposed.

2. A bicycle as provided for in claim 1, wherein the clamping means consists of a U-bolt bridging the division line of said tube.

3. In a bicycle having a frame composed of two separable sections, the frame including an upper tube transversely divided, a tubular insert located within the tube and a U-shaped clamp having connected legs engaging the parts of the tube and parts of the insert on the opposite sides of the point of division of the upper tube.

References Cited by the Examiner
UNITED STATES PATENTS

| | | | |
|---|---|---|---|
| 710,387 | 9/02 | Williams | 287—2 |
| 780,810 | 1/05 | Payne | 287—2 |
| 1,420,670 | 6/22 | Schuette | 287—108 |
| 1,427,402 | 8/22 | Malec | 280—278 |
| 2,365,414 | 12/44 | Kruse | 287—119 |
| 2,467,269 | 4/49 | Miller | 287—108 |
| 2,746,769 | 5/56 | Hoogendorn | 280—287 |
| 2,805,016 | 9/57 | Brooking et al. | 287—99 |
| 2,849,105 | 8/58 | Touton | 287—2 |

A. HARRY LEVY, *Primary Examiner.*

KENNETH H. BETTS, *Examiner.*